United States Patent
Lee

(10) Patent No.: US 7,817,181 B2
(45) Date of Patent: Oct. 19, 2010

(54) METHOD, MEDIUM, AND APPARATUS FOR 3-DIMENSIONAL ENCODING AND/OR DECODING OF VIDEO

(75) Inventor: Yung-Iyul Lee, Seoul (KR)

(73) Assignees: Sejong Industry - Academy Cooperation Foundation, Seoul (KR); Samsung Electronics Co., Ltd., Suwon-Si (KR)

( * ) Notice: Subject to any disclaimer, the term of this patent is extended or adjusted under 35 U.S.C. 154(b) by 1609 days.

(21) Appl. No.: 11/038,477

(22) Filed: Jan. 21, 2005

(65) Prior Publication Data

US 2005/0185712 A1  Aug. 25, 2005

(30) Foreign Application Priority Data

Jan. 20, 2004  (KR)  .................. 10-2004-0004423

(51) Int. Cl.
    *H04N 7/18* (2006.01)
(52) U.S. Cl. .......................................... 348/43; 348/48
(58) Field of Classification Search ............ 348/42–61
    See application file for complete search history.

(56) References Cited

U.S. PATENT DOCUMENTS

| | | | | |
|---|---|---|---|---|
| 5,612,735 A * | 3/1997 | Haskell et al. | ................ | 348/43 |
| 5,652,616 A * | 7/1997 | Chen et al. | .................... | 348/43 |
| 6,055,012 A * | 4/2000 | Haskell et al. | ................ | 348/48 |
| 6,567,081 B1 | 5/2003 | Li et al. | | |
| 7,333,544 B2 * | 2/2008 | Kim et al. | .............. | 375/240.16 |
| 7,468,745 B2 * | 12/2008 | Xin et al. | ................ | 348/218.1 |
| 7,489,342 B2 * | 2/2009 | Xin et al. | ................ | 348/218.1 |
| 2002/0176499 A1 | 11/2002 | Tatsuzawa | | |
| 2003/0202592 A1 | 10/2003 | Sohn et al. | | |
| 2004/0028282 A1 * | 2/2004 | Kato et al. | .................. | 382/236 |

FOREIGN PATENT DOCUMENTS

| | | |
|---|---|---|
| JP | 6-269025 | 9/1994 |
| JP | 7-50856 | 2/1995 |
| JP | 2001-16609 | 1/2001 |
| JP | 2001-61164 | 3/2001 |
| KR | 2002-32954 | 2/2003 |
| KR | 2003-37140 | 5/2003 |
| KR | 2003-83285 | 10/2003 |
| KR | 10-2004-0065014 | 7/2004 |

OTHER PUBLICATIONS

J. D. Oh, Y. S. Choi, R. H. Park, J. W. Kim, and B. H. Choi, "Trinocular Stereo Coding Based On MPEG-2", in Proc. $8^{th}$ Korea-Japan Joint Workshop Frontiers of Computer Vision FCV 2002, pp. 25-30, Hokkaido University, Sapporo Japan, Jan./Feb. 2002.
International Search Report for PCT/KR2005/000182.
Chinese Patent Office Action, mailed Jun. 6, 2008 in regards to Chinese application No. 200580000210X.

* cited by examiner

*Primary Examiner*—Andy S Rao
(74) *Attorney, Agent, or Firm*—Staas & Halsey LLP

(57) ABSTRACT

A method, medium, and apparatus for 3-dimensional encoding and/or decoding of videos, including adapting to temporal and spatial characteristics of the videos. Methods include performing temporal estimation on videos taken by a camera located in a centerly position with reference to videos taken by the same camera at immediately previous times, when a plurality of other cameras are arranged in a row, and performing temporal-spatial estimation on videos taken by the other cameras with reference to previous videos taken by cameras adjacent to the camera located in the centerly position.

49 Claims, 7 Drawing Sheets

CENTER CAMERA f(0,-4,0) f(0,-2,0) f(0,0,0) f(0,2,0) f(0,4,0)

TIME t

METHOD, MEDIUM, AND APPARATUS FOR 3-DIMENSIONAL ENCODING AND/OR DECODING OF VIDEO

CROSS-REFERENCE TO RELATED APPLICATIONS

This application claims the benefit of Korean Patent Application No. 2004-4423, filed on Jan. 20, 2004, in the Korean Intellectual Property Office, the disclosure of which is incorporated herein in its entirety by reference.

BACKGROUND OF THE INVENTION

1. Field of the Invention

Embodiments of the present invention relate to video encoding and decoding, and more particularly, to a method, medium, and apparatus for 3-dimensional encoding and/or decoding of video, which includes adapting to temporal and spatial characteristics of the video.

2. Description of the Related Art

Video encoding in Moving picture expert group (MPEG)-4 part 2 and H. 264 (MPEG-4 advanced video encoding (AVC)) involves 2-dimensional encoding of videos and focuses on improving encoding efficiency. However, in the field of real-like communication or virtual reality, 3-dimensional encoding and reproduction of videos are also required. Therefore, studies should be conducted on 3-dimesional encoding of audio video (AV) data instead of conventional 2-dimesional encoding.

MPEG, which is an organization for standardizing video encoding, has made efforts to establish standards for 3-dimensional encoding of AV data. As a part of such efforts, a 3-dimensional AV encoding ad-hoc group (AHG) has been organized and standardization is in progress.

SUMMARY OF THE INVENTION

Embodiments of the present invention include a method, medium, and apparatus for 3-dimensional encoding and/or decoding of video by which video data received from a plurality of cameras and is coded/decoded 3-dimensionally.

Additional aspects and/or advantages of the invention will be set forth in part in the description which follows and, in part, will be obvious from the description, or may be learned by practice of the invention.

To achieve the above and/or other aspects and advantages, embodiments of the present invention set forth a method for 3-dimensional encoding of videos, the method including performing temporal estimation on video taken by a centerly located camera with reference to video taken by the centerly located camera at least an immediately previous time, when a plurality of other cameras are arranged in a row, with the centerly located camera being at a central position of the row, and performing temporal-spatial estimation on videos taken by the other cameras with reference to previous-in-time videos taken by cameras adjacent to the centerly located camera and the video taken by the centerly located camera at the at least the immediately previous time.

A result of the performed temporal estimation on video taken by the centerly located camera may be a base layer video and a result of the performed temporal-spatial estimation on videos taken by the other cameras may be at least one enhancement layer video for the base layer video.

In the performing of the temporal-spatial estimation on videos taken by the other cameras the temporal-spatial estimation may be performed on previous-in-time videos referred to by the videos taken by the other cameras with reference to a number of previous-in-time videos which is equal to a predetermined number of reference pictures. In addition, the predetermined number of reference pictures may be 5.

Further, in the temporal-spatial estimation on videos taken by the other cameras temporal-spatial estimation may also be performed with reference to current videos taken by cameras adjacent to the centerly located camera. The temporal-spatial estimation on videos taken by the other cameras temporal-spatial estimation may also be performed with reference to videos taken by all of a plurality of cameras that fall within a range of an angle between previous-in-time videos taken by cameras adjacent to the centerly located camera and videos to be presently estimated.

To achieve the above and/or other aspects and advantages, embodiments of the present invention set forth a method for 3-dimensional encoding of videos, the method including referring to a previous-in-time video taken by a camera adjacent to a center of a video to be presently encoded, and performing temporal-spatial estimation with reference to as many previous-in-time videos adjacent to the camera adjacent to the center of the video according to a predetermined number of reference pictures.

A result of the referring may be a base layer video and a result of the performed temporal-spatial estimation may be at least one enhancement layer video for the base layer video.

In addition, an angle between the camera adjacent to the center of the video and the video to be presently encoded may vary according to an interval between adjacent cameras.

To achieve the above and/or other aspects and advantages, embodiments of the present invention set forth a method for 3-dimensional encoding of videos, by which a plurality of videos taken by cameras arranged 2-dimensionally are encoded, the method including encoding videos taken by a camera centerly located among other cameras arranged 2-dimensionally, and sequentially encoding videos taken by the other cameras in an order based on shortest distances from the centerly located camera.

A result of the encoding of videos taken by the camera centerly located may be a base layer video and a result of the sequential encoding may be at least one enhancement layer video for the base layer video.

Further, in the sequentially encoding, if there are a plurality of cameras having a same distance from the centerly located camera, encoding of the plurality of cameras having the same distance may be sequentially performed in a spiral manner.

To achieve the above and/or other aspects and advantages, embodiments of the present invention set forth a medium including computer readable code to implement a method for 3-dimensional encoding of videos, the method including performing temporal estimation on video taken by a centerly located camera with reference to videos taken by the centerly located camera at least an immediately previous time, when a plurality of other cameras are arranged in a row, with the centerly located camera being at a central position of the row, and performing temporal-spatial estimation on videos taken by the other cameras with reference to previous-in-time videos taken by cameras adjacent to the centerly located camera and the video taken by the centerly located camera at the at least the immediately previous time.

To achieve the above and/or other aspects and advantages, embodiments of the present invention set forth an encoder for 3-dimensional encoding, including a first encoder to perform temporal estimation on video taken by a centerly located camera with reference to video taken by the centerly located camera at least an immediately previous time, when a plurality of other cameras are arranged in a row, with the centerly located camera being at a central position of the row, a second encoder to perform temporal-spatial estimation on videos taken by the other cameras with reference to previous-in-time videos taken by cameras adjacent to the centerly located camera and the video taken by the centerly located camera at the at least the immediately previous time, and a multiplexer to multiplex an output of the first encoder and an output of the second encoder.

In the second encoder the temporal-spatial estimation may be performed on previous-in-time videos referred to by the videos taken by the other cameras with reference to a number of previous-in-time videos which is equal to a predetermined number of reference pictures.

In addition, an output of the first encoder may be a base layer video and an output of the second encoded may be at least one enhancement layer video for the base layer video.

To achieve the above and/or other aspects and advantages, embodiments of the present invention set forth an encoder for 3-dimensional encoding of videos, including a first encoder encoding present time video taken by a camera adjacent to a center of a video by referring to a previous-in-time video of the camera adjacent to the center of the video, a second encoder to perform temporal-spatial estimation with reference to as many previous-in-time videos adjacent to the camera adjacent to the center of the video according to a predetermined number of reference pictures, and a multiplexer to multiplex an output of the first encoder and an output of the second encoder.

To achieve the above and/or other aspects and advantages, embodiments of the present invention set forth an encoder for 3-dimensional encoding of videos, by which a plurality of videos taken by cameras arranged 2-dimensionally are encoded, including a first encoder to encode videos taken by a camera centerly located among other cameras arranged 2-dimensionally, a second encoder to sequentially encode videos taken by the other cameras in an order based on shortest distances from the centerly located camera, and a multiplexer to multiplex an output of the first encoder and an output of the second encoder.

To achieve the above and/or other aspects and advantages, embodiments of the present invention set forth an encoding system for 3-dimensional encoding, including a plurality of cameras, with at least one camera of the plurality of cameras being centerly located among the plurality of cameras, a first encoder to perform temporal estimation on video taken by the centerly located camera with reference to video taken by the centerly located camera at least an immediately previous time, when a plurality of other cameras, of the plurality of cameras, are arranged in a row, with the centerly located camera being at a central position of the row, a second encoder to perform temporal-spatial estimation on videos taken by the other cameras with reference to previous-in-time videos taken by cameras adjacent to the centerly located camera and the video taken by the centerly located camera at the at least the immediately previous time, and a multiplexer to multiplex an output of the first encoder and an output of the second encoder.

To achieve the above and/or other aspects and advantages, embodiments of the present invention set forth a method for 3-dimensional decoding of videos, the method including demultiplexing a video bitstream into a base layer video and at least one enhancement layer video, decoding the base layer video, to decode video encoded by performed temporal estimation for video taken by a centerly located camera with reference to video taken by the centerly located camera at least an immediately previous time, when a plurality of other cameras were arranged in a row, with the centerly located camera being at a central position of the row, and decoding the at least one enhancement layer video, based on network resources, to decode video encoded by performed temporal-spatial encoding on videos taken by the other cameras with reference to previous-in-time videos taken by cameras adjacent to the centerly located camera and the video taken by the centerly located camera at the at least the immediately previous time.

To achieve the above and/or other aspects and advantages, embodiments of the present invention set forth a method for 3-dimensional decoding of videos, the method including demultiplexing a video bitstream into a base layer video and at least one enhancement layer video, decoding the base layer video, to decode video encoded by referring to a previous-in-time video taken by a camera adjacent to a center of a video to be then presently encoded, and decoding the at least one enhancement layer video, based on network resources, to decode video encoded by performed temporal-spatial estimation with reference to as many previous-in-time videos adjacent to the camera adjacent to the center of the video according to a predetermined number of reference pictures.

To achieve the above and/or other aspects and advantages, embodiments of the present invention set forth a method for 3-dimensional decoding of videos, by which a plurality of videos taken by cameras arranged 2-dimensionally were encoded, the method including demultiplexing a video bitstream into a base layer video and at least one enhancement layer video, decoding the base layer video, to decode video encoded by encoding videos taken by a camera centerly located among other cameras arranged 2-dimensionally, and decoding the at least one enhancement layer video, based on network resources, to decode video encoded by sequentially encoding videos taken by the other cameras in an order based on shortest distances from the centerly located camera.

To achieve the above and/or other aspects and advantages, embodiments of the present invention set forth a computer readable medium including computer readable code to implement a method for 3-dimensional decoding of videos, the method including demultiplexing a video bitstream into a base layer video and at least one enhancement layer video, decoding the base layer video, to decode video encoded by performed temporal estimation on videos taken by a centerly located camera with reference to videos taken by the centerly located camera at least an immediately previous time, when a plurality of other cameras were arranged in a row, with the centerly located camera being at a central position of the row, and decoding the at least one enhancement layer video, based on network resources, to decode video encoded by performed temporal-spatial estimation on videos taken by the other cameras with reference to previous-in-time videos taken by cameras adjacent to the centerly located camera and the video taken by the centerly located camera at the at least the immediately previous time.

To achieve the above and/or other aspects and advantages, embodiments of the present invention set forth a decoder for 3-dimensional decoding of videos, including a demultiplexer to demultiplex a video bitstream into a base layer video and at least one enhancement layer video, a first decoder to decode the base layer video, by decoding video encoded by performed temporal estimation for video taken by a centerly located camera with reference to video taken by the centerly located camera at least an immediately previous time, when a plurality of other cameras were arranged in a row, with the centerly located camera being at a central position of the row, and a second decoder to decode the at least one enhancement layer video, based on network resources, by decoding video encoded by performed temporal-spatial encoding on videos taken by the other cameras with reference to previous-in-time videos taken by cameras adjacent to the centerly located camera and the video taken by the centerly located camera at the at least the immediately previous time.

To achieve the above and/or other aspects and advantages, embodiments of the present invention set forth a decoder for 3-dimensional decoding of videos, including a demultiplexer to demultiplex a video bitstream into a base layer video and at least one enhancement layer video, a first decoder to decode the base layer video, by decoding video encoded by referring to a previous-in-time video taken by a camera adjacent to a center of a video to be then presently encoded, and a second decoder to decode the at least one enhancement layer video, based on network resources, by decoding video encoded by performed temporal-spatial estimation with reference to as many previous-in-time videos adjacent to the camera adjacent to the center of the video according to a predetermined number of reference pictures.

To achieve the above and/or other aspects and advantages, embodiments of the present invention set forth a decoder for 3-dimensional decoding of videos, by which a plurality of videos taken by cameras arranged 2-dimensionally were encoded, including a demultiplexer to demultiplex a video bitstream into a base layer video and at least one enhancement layer video, a first decoder to decode the base layer video, by decoding video encoded by encoding videos taken by a camera centerly located among other cameras arranged 2-dimensionally, and a second decoder to decode the at least one enhancement layer video, based on network resources, by decoding video encoded by sequentially encoding videos taken by the other cameras in an order based on shortest distances from the centerly located camera.

To achieve the above and/or other aspects and advantages, embodiments of the present invention set forth a 3-dimensional encoded signal, including a base layer video encoded through performed temporal estimation on video taken by a centerly located camera with reference to videos taken by the centerly located camera at least an immediately previous time, when a plurality of other cameras were arranged with the centerly located camera being at a central position of the arranged centerly located camera, and at least one enhancement layer video encoded through performed temporal-spatial estimation on videos taken by the other cameras with reference to previous-in-time videos taken by cameras adjacent to the centerly located camera and the video taken by the centerly located camera at the at least the immediately previous time, wherein the base layer video and the at least one enhancement layer video are multiplexed to generate the 3-demensional encoded signal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
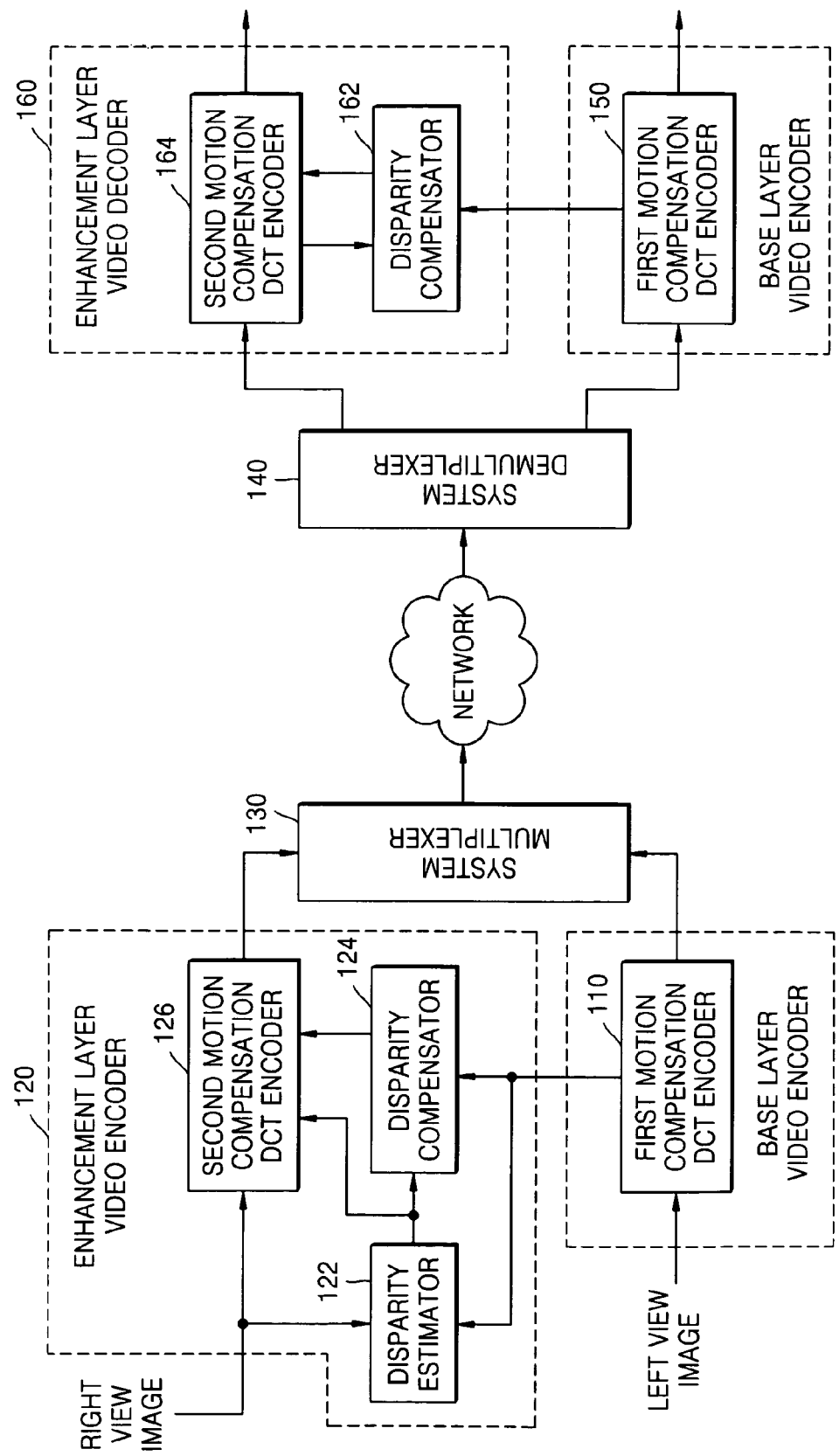
FIG. 1 is a view illustrating encoding and reproduction of stereoscopic videos using a left view video and a right view video, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a view illustrating encoding and reproduction of stereoscopic video using left view video and right view video, according to an embodiment of the present invention.

As illustrating in FIG. 1, in an MPEG-2 multi-view profile (13818-2), 3-dimensional video can be coded and reproduced using a scalable codec in which a correlation between the left view video and right view video is searched and a disparity between the two videos is coded according to a condition of a corresponding network. Encoding is carried out using the left view video as base layer video and the right view video as enhancement layer video. The base layer video indicates video that can be coded as it is, while the enhancement layer video indicates video that is additionally coded and later used to improve the quality of the base layer video when the corresponding network transporting the two video layers is in good condition, i.e., when the network conditions are not favorable only the base layer video may be reproduced. As such, encoding using both the base layer video and the enhancement layer video is referred to as scalable encoding.

The left view video can be coded by a first motion compensated DCT encoder 110. A disparity between the left view video and the right view video can be calculated by a disparity estimator 122, which estimates a disparity between the left view video and the right view video, and a disparity compensator 124 and can then be coded by a second motion compensated DCT encoder 126. Assuming that the first motion compensated DCT encoder 110 that encodes the left view video is a base layer video encoder, the disparity estimator 122, the disparity compensator 124, and the second motion compensated DCT encoder 126 that involve encoding the disparity between the left view video and the right view video may be referred to as an enhancement layer video encoder 120. The encoded base layer video and enhancement layer video can then be multiplexed by a system multiplexer 130 and transmitted to for subsequent decoding.

In the decoding, multiplexed data can be decomposed into the left view video and the right view video by a system demultiplexer 140. The left view video can be decoded by a first motion compensated DCT decoder 150. Disparity video is then restored to the right view video by a disparity compensator 162, which compensates for the disparity between the left view video and the right view video, and a second motion compensated DCT decoder 164. Assuming that the first motion compensated DCT decoder 150 that decodes the left view video is a base layer video decoder, the disparity compensator 162 and the second motion compensated DCT decoder 164 that involve searching the disparity between the left view video and the right view video and decoding the right view video can be referred to as an enhancement layer video decoder 160.

Figure 2A:
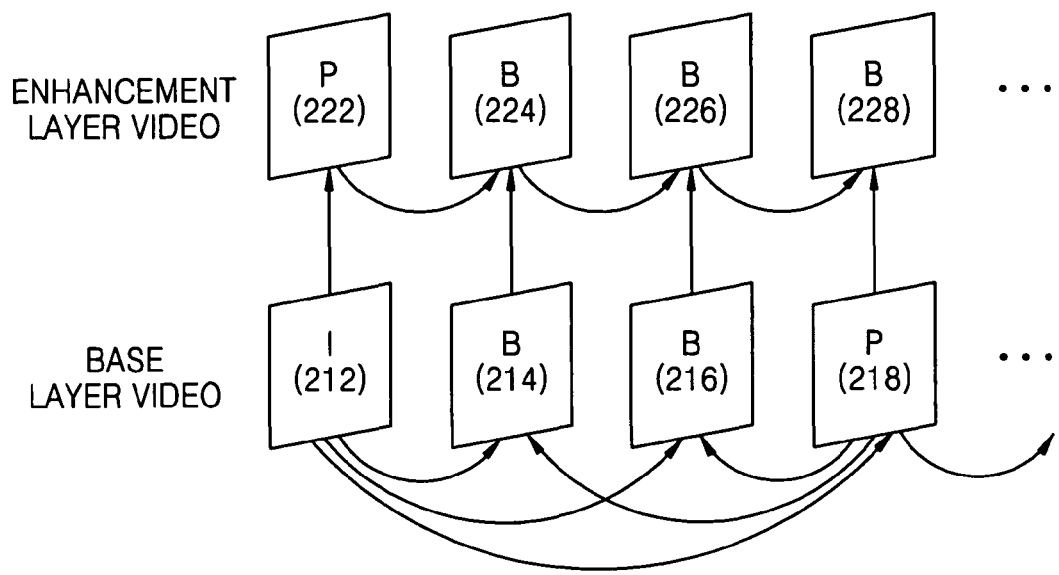
FIGS. 2A and 2B illustrate exemplary structures of a base layer video and an enhancement layer video.
Figure 2B:
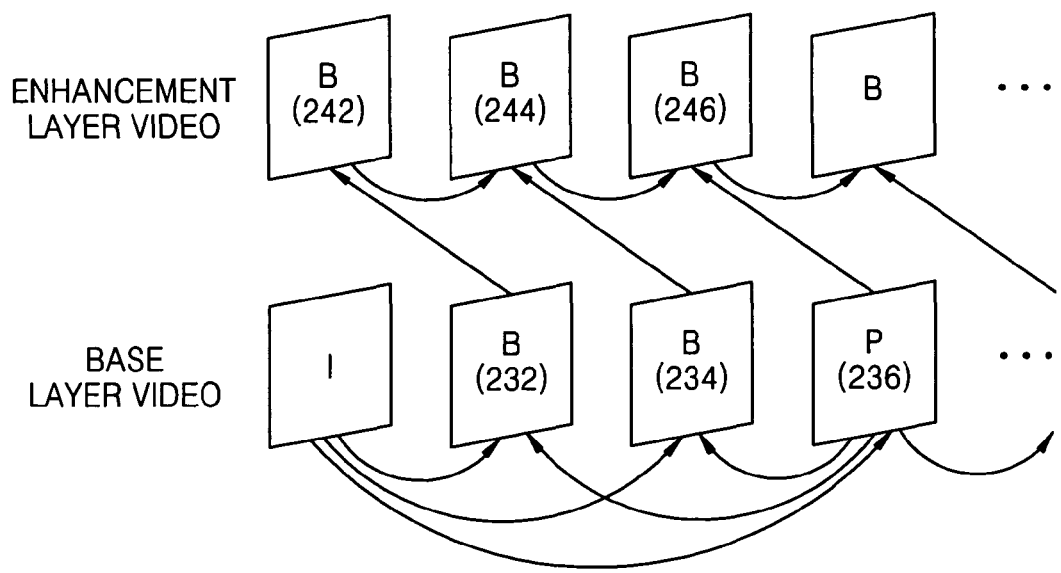

FIGS. 2A and 2B illustrate exemplary structures of base layer video and enhancement layer video.

As illustrated in FIG. 2A, similar to video encoding in MPEG-2 or MPEG-4, the base layer video, which is of a left view video type, is encoded using an intra picture (called an I picture) 212, a predictive picture (called a P picture) 218, and bi-directional pictures (called B pictures) 214 and 216. On the other hand, the enhancement layer video, which is of a right view video type, may include a P picture 222 encoded with reference to the I picture 212 of a left view video type, a B picture 224 encoded with reference to the P picture 222 of a right view video type and the B picture 214 of a left view video type, a B picture 226 encoded with reference to the B picture 224 of a right view video type and the B picture 216 of a left view video type, and a B picture 228 encoded with reference to the B picture 226 of a right view video type and the P picture 218 of a left view video type. In other words, the disparity can be encoded with reference to the base layer video. In the illustration of FIG. 2A, the direction of the arrows indicate encoding of respective video with reference to video identified to by the arrow point.

FIG. 2B illustrates another exemplary structure of the enhancement layer video.

Referring to FIG. 2B, the enhancement layer video of a right view video type can include a B picture 242 encoded with reference to a B picture 232 of a left view video type, a B picture 244 encoded with reference to the B picture 242 of a right view video type and a B picture 234 of a left view video type, and a B picture 246 encoded with reference to the B picture 244 of a right view video type and a P picture 236 of a left view video type.

Figure 3:
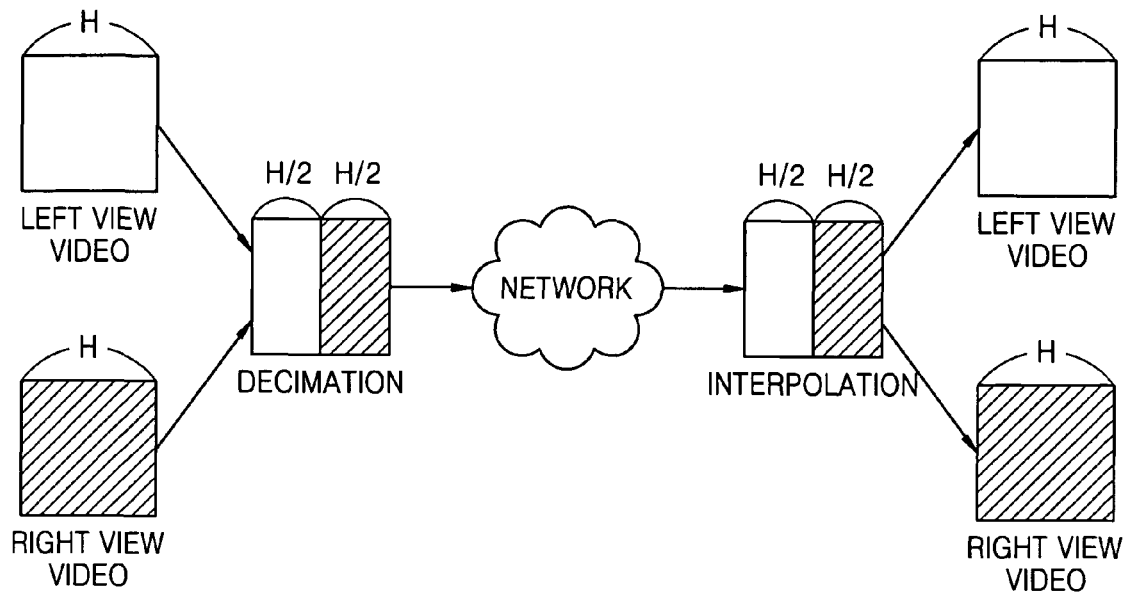
FIG. 3 is a view illustrating creation of a single video using decimation of the left view video and right view video and reconstruction of the single video into a left view video and a right view video using interpolation of the single video, according to an embodiment of the present invention.

FIG. 3 is a view illustrating creation of a single video using decimation of the left view video and right view video and reconstruction of the single video into left view video and right view video using interpolation of the single video.

Referring to FIG. 3, stereo video encoding can be performed in an MPEG-2 main profile (MP) that uses motion encoding and disparity encoding. Two videos can be combined into one video by horizontally decimating the left view video and the right view video to ½ in stereo video encoding and then reducing the bandwidth by ½. The combined video can then be transmitted to a decoder. A decoder receives the combined video and restores the original videos by decomposing the combined video into the left view video and the right view video and two times interpolating the left view video and the right view video.

Figure 4:
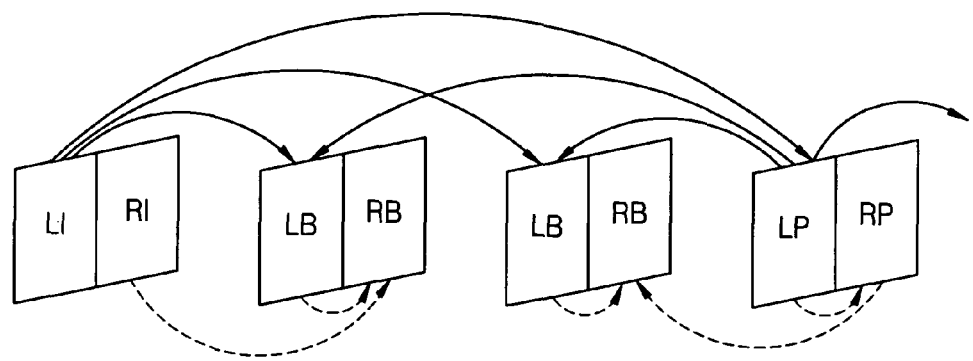
FIG. 4 is a view illustrating motion estimation/compensation of decimated video composed of a left view video and a right view video.

FIG. 4 is a view illustrating motion estimation/compensation of a decimated video including the left view video and the right view video.

As illustrated in FIG. 4, the enhancement layer videos RI, RB, and RP can be encoded with reference to enhancement layer videos adjacent to base layer videos Li, LB, and LP. Here, RI represents the I picture of a right view video type, RB represents the B picture of a right view video type, RP represents the P picture of a right view video type, LI represents the I picture of a left view video type, LB represents the B picture of a left view video type, and LP represents the P picture of a left view video type.

However, such an encoding method has problems that disparity information is not efficiently compressed and a difference in display quality between the left view video and the right view video becomes consistently greater than 0.5-1.5 dB. Also, if several cameras exist for one scene, it becomes difficult to receive the extra video data.

Figure 5A:
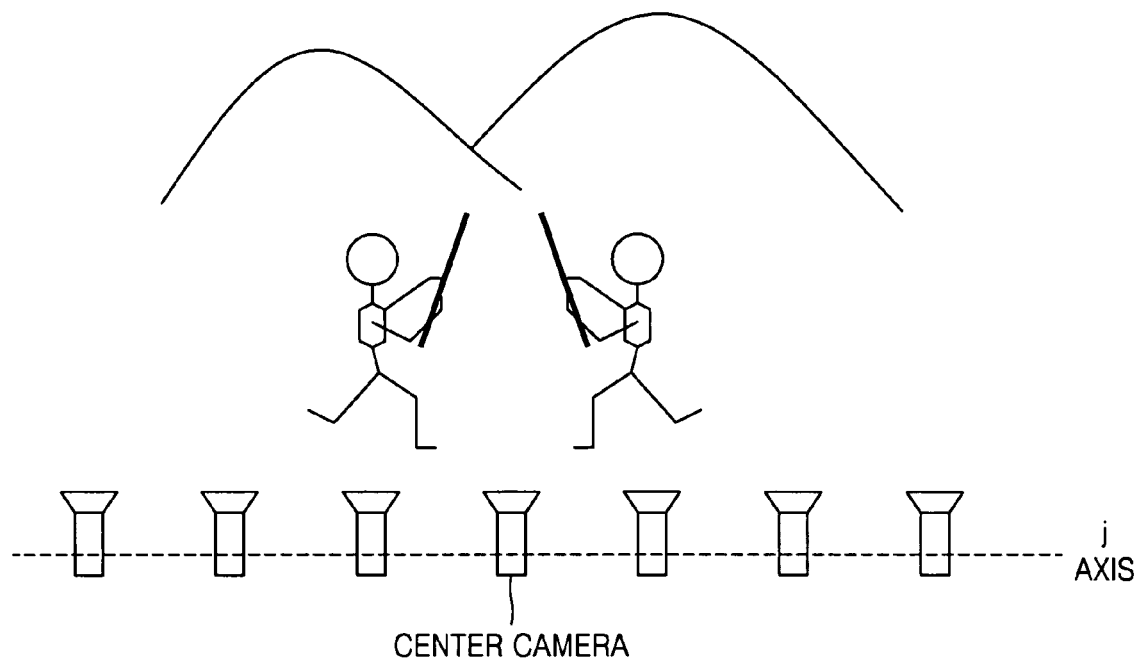
FIG. 5A illustrates encoding of a plurality of video data received from cameras arranged in a row, according to an embodiment of the present invention.

FIG. 5A is a view illustrating encoding video data received from a plurality of cameras arranged in a row.

Referring to FIG. 5A, the plurality of cameras can be arranged in a row, e.g., in a one-dimensional line. In embodiments of the present invention, it may be assumed that the cameras exist in a 2-dimensional space composed of i axis and j axis. However, to explain an embodiment of the present invention the case where the plurality of cameras are illustrated as existing in only a one-dimensional space, i.e., i of (i,j) is equal to 0. If i is not equal to zero, a plurality of cameras will exist in a 2-dimensional space. Such an example will be described later with reference to FIG. 7.

Figure 5B:
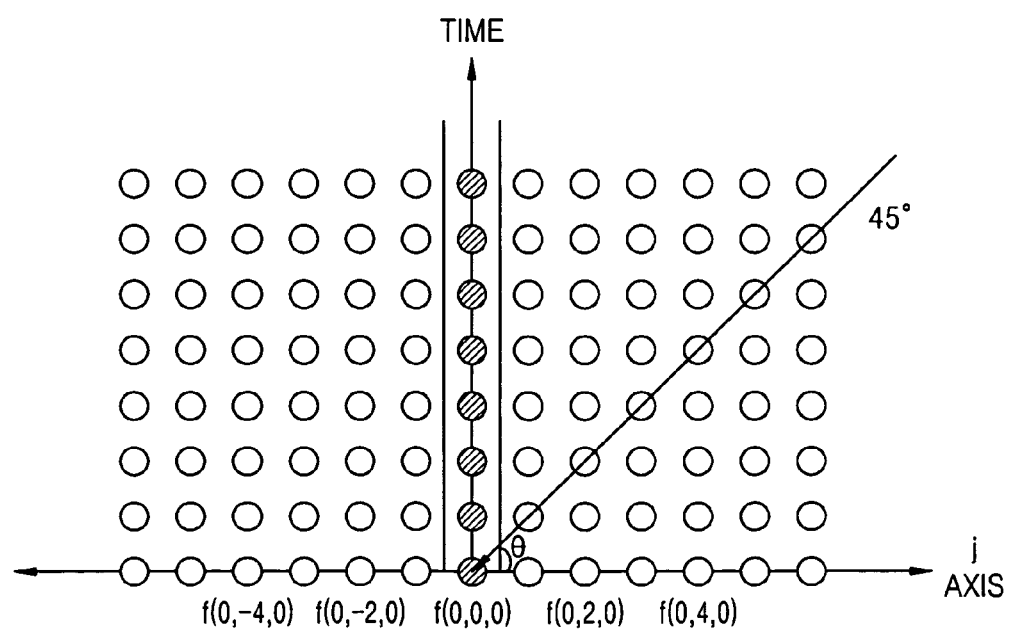
FIG. 5B illustrates video taken by a plurality of cameras over time due to scene change.

FIG. 5B illustrates video taken by a plurality of cameras over time, e.g., with scene changes.

With videos taken by one of the camera being identified by $f(i, j, t)$, at a particular time t, $(i, j)$ will identify the position of the camera, and when i is equal to 0 the corresponding camera exists in only one dimensional space, as illustrated in FIGS. 5A and 5B. For example, $f(0, 0, 0)$ identifies a video taken by a center camera at the initial time. If videos taken by other cameras are arranged along the time axis, there will also exist an angle θ with respect to videos taken by adjacent cameras at the adjacent time t. The angle information θ can also be used for encoding and decoding.

Figure 6A:
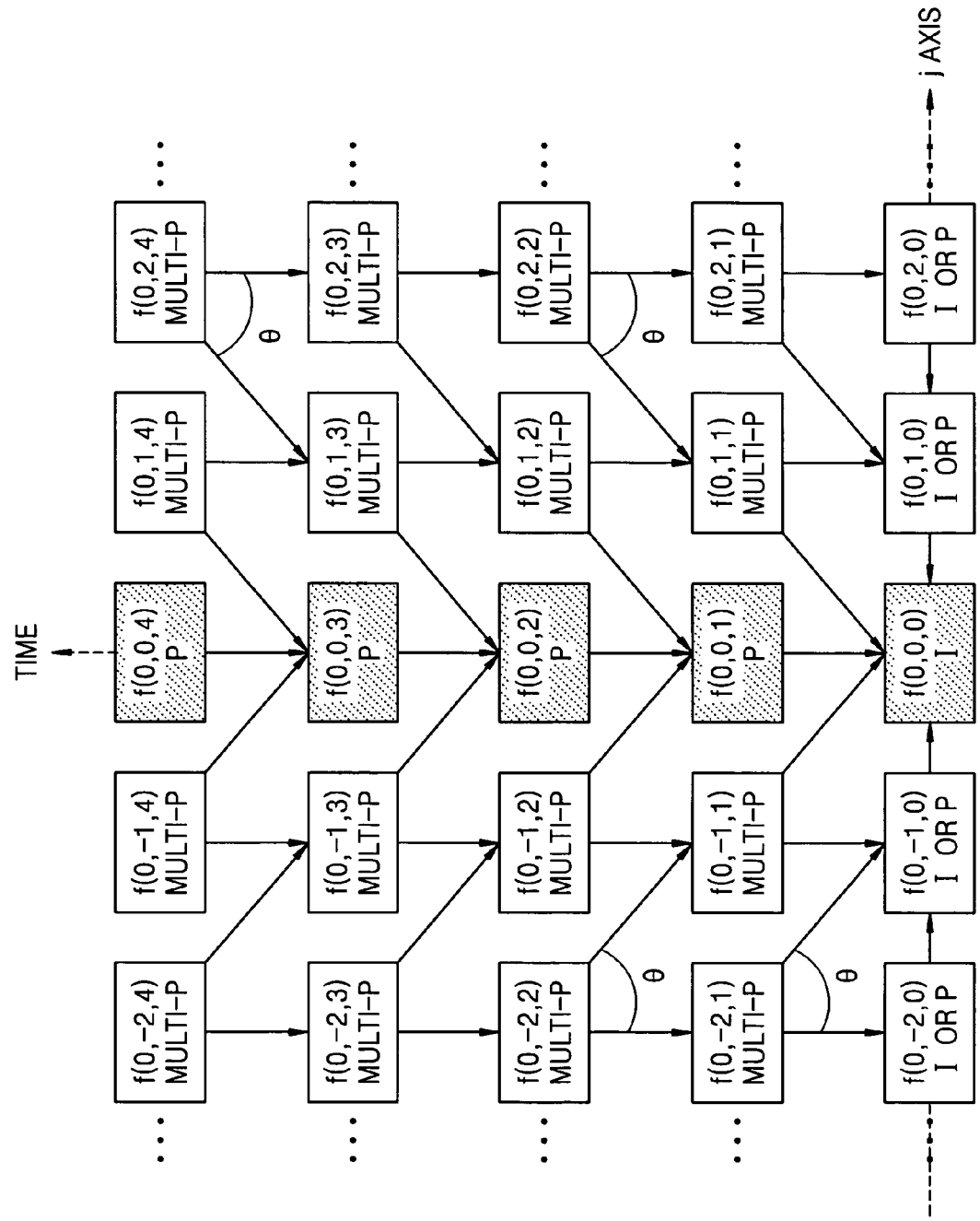
FIGS. 6A and 6B are views illustrating 3-dimensional encoding of videos according to the present invention, according to embodiments of the present invention.
Figure 6B:
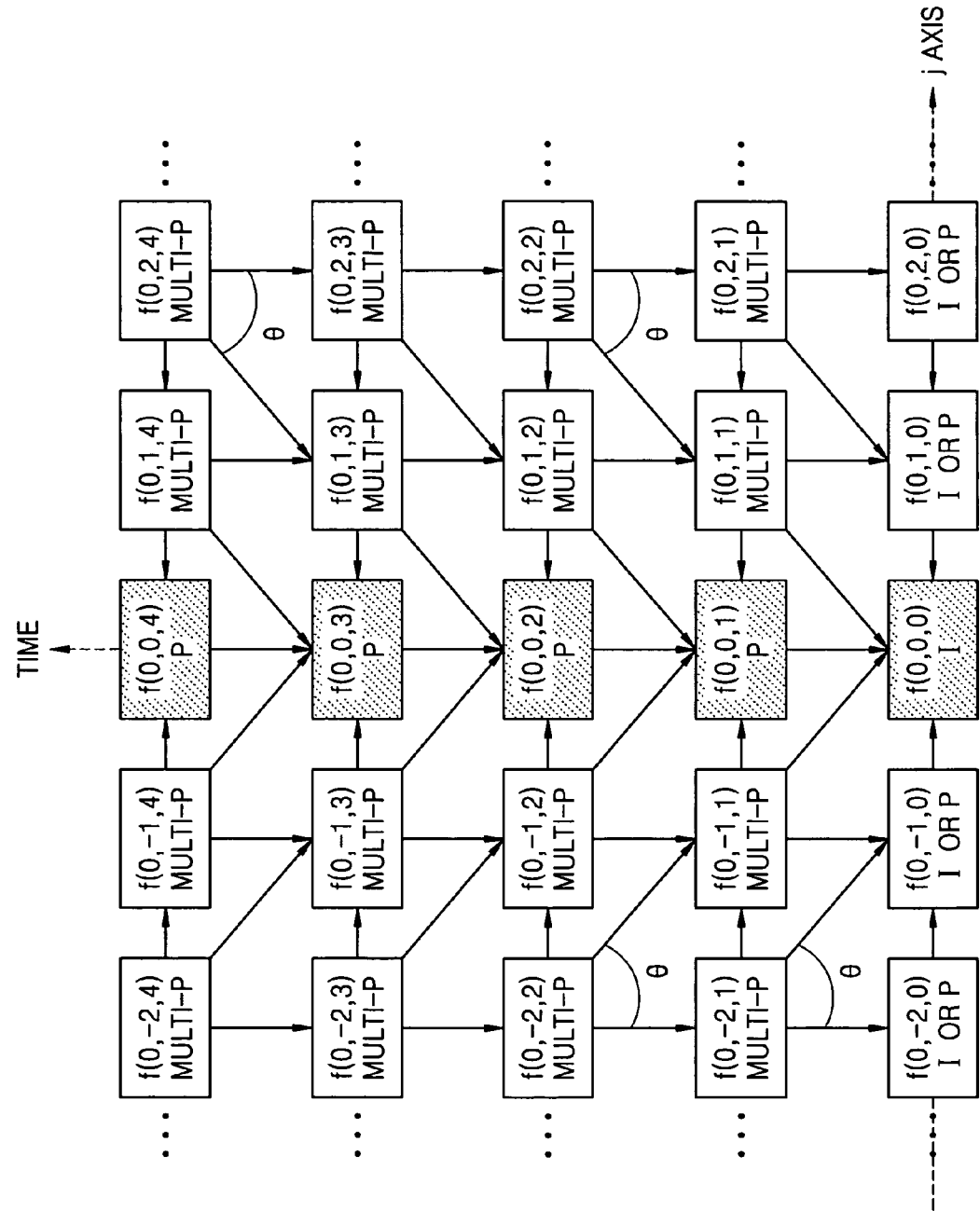

FIGS. 6A and 6B are views illustrate 3-dimensional encoding of video, according to an embodiment of the present invention.

As illustrated in FIG. 6A, videos $f(0, 0, 0)$, $f(0, 0, 1)$, $f(0, 0, 2)$, $f(0, 0, 3)$, and $f(0, 0, 4)$, respectively from cameras located at center positions $(0, 0, t)$ from a first direction, are each encoded into base layer videos, i.e., they are each temporally estimated and encoded only with reference to an immediately previous-in-time base layer videos. For example, $f(0, 0, 2)$ is estimated with reference to $f(0, 0, 1)$, and $f(0, 0, 3)$ is estimated with reference to $f(0, 0, 2)$. As an example, a maximum number of five reference videos can be used. Videos $f(0, -1, t)$ taken by cameras located in positions $(0, -1, t)$ are encoded into first enhancement layer videos. Specifically, videos $f(0, -1, t)$ can be estimated using temporally previous-in-time decoded videos and reference videos of $f(0, -1, t-1~t-5)$. For examples, video $f(0, -1, 2)$ can be estimated with reference to videos $f(0, 0, 1)$ and $f(0, -1, 1)$, and video $f(0, -1, 3)$ can be estimated with reference to videos $f(0, 0, 2)$ and $f(0, -1, 2)$. Again, in this example, a maximum of five reference videos are used in motion estimation into the base layer videos. In other words, motion is temporal-spatial estimated and then encoded.

Videos of other layers can be encoded in the same way as the above. In other words, videos $f(0, -2, t)$ taken from camera positions $(0, -2, t)$ can be encoded into third enhancement layer videos, videos $f(0, 1, t)$ taken from camera positions $(0, 1, t)$ can be encoded into second enhancement layer videos, and videos $f(0, 2, t)$ taken from camera positions $f(0, 2, t)$ can be encoded into fourth enhancement layer videos.

As further illustrated in FIG. 6B, for encoding of enhancement layer videos, adjacent layer videos can also be referred to, according to another embodiment of the present invention. In this case, since a greater number of reference videos are used, display quality of restored videos can be improved.

Figure 7:
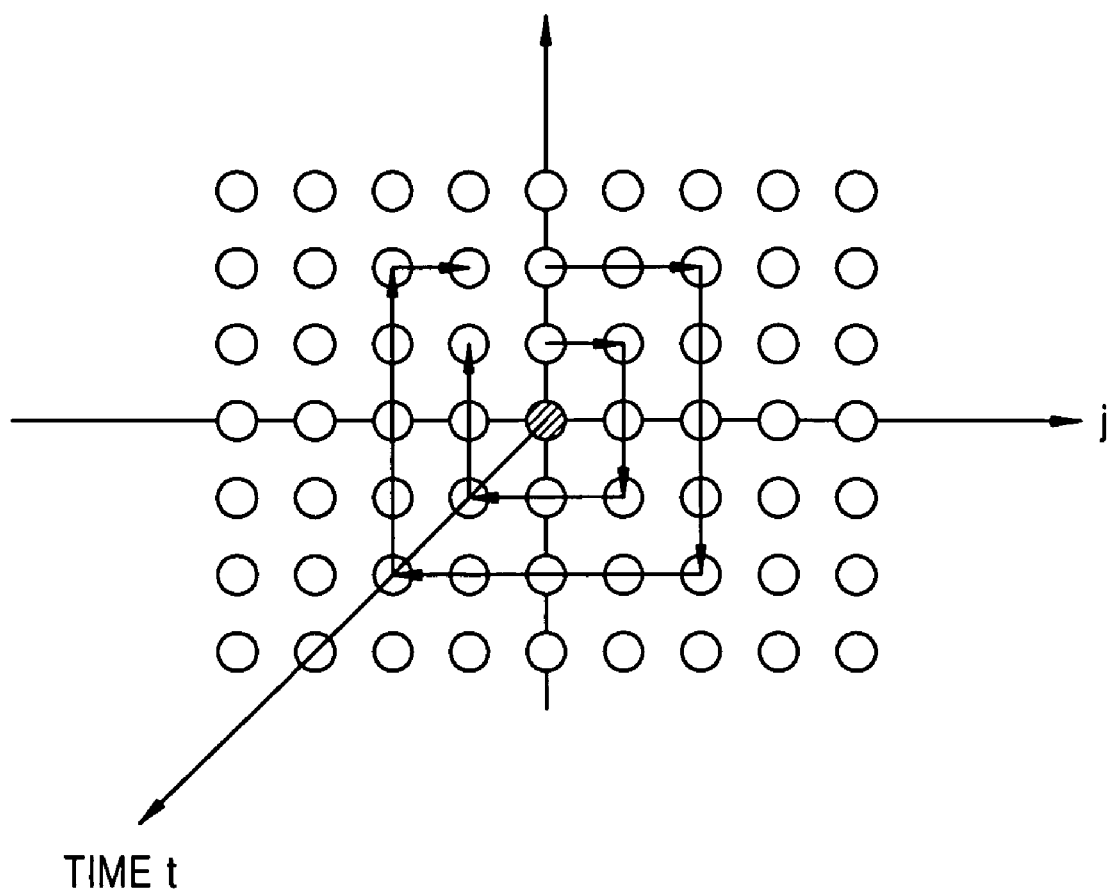
FIG. 7 illustrates camera positions and an order of encoding when the plurality of cameras exists in a 2-dimensional space, according to an embodiment of the present invention.

FIG. 7 illustrates camera positions and an order of encoding when a plurality of cameras exists in a 2-dimensional space.

Referring to FIG. 7, camera positions are illustrated when cameras exist two dimensionally and t is equal to 0. According to one order of encoding videos taken by cameras, videos taken by a camera located in a centerly position can be encoded first, and videos taken by the 8 cameras that are located closest to the centerly positioned camera, e.g., those that have a distance of 1 from the centerly positioned camera (it is assumed here that the distance from one camera to another is 1) are sequentially encoded in a spiral manner. Then, videos taken from the 16 cameras that have a distance of 2 from the centerly positioned camera are sequentially encoded in a spiral manner. Such encoding can be arranged as follows.

(1) f (0, 0): distance=0

(2) f(1, 0), f(1, 1), f(0, 1), f(−1, −1), f(−1, 0), f(−1, −1), f(0, −1), f(1, −1): distance=1

(3) f (2, 0), f (2, 1), f (2, 2), ••• : distance=2

(4) f (3, 0), f (3, 1), ••• : distance=3

If encoding is performed in the order described above, although the bandwidth of a corresponding network may be reduced, videos from all the cameras cannot be encoded and transmitted, and thus only a portion of the videos is transmitted. Accordingly, to overcome this potential bandwidth issue, videos from N cameras can be spatially-temporally predicted and restored using bilinear interpolation or sync function type interpolation. Therefore, once 3-dimensional video information from cameras located in positions (i, j, t) is encoded and transmitted to the decoder, even though only partial data is transmitted when the bandwidth of a network is poor, the decoder can still restore the original videos by performing interpolation.

A method for encoding, according to an embodiment of the present invention, can be further explained using a video f (0, 6, 6) as an example, as follows.

(1) f (0, 6, 5), f (0, 6, 4), f (0, 6, 3), f (0, 6, 2), f (0, 6, 1): When j is equal to 6, temporal prediction, i.e., motion estimation/compensation can be performed. At this time, the number of reference pictures is 5, noting that the number of reference pictures is subject to change according to various circumstances.

(2) Temporal-spatial prediction can be performed from the video f (0, 6, 6) towards a center picture. At this time, temporal-spatial prediction is performed using a previously defined angle θ. In other words, temporal-spatial prediction can be performed on all the pictures that fall within a range of the angle θ. If θ is equal to 45°, prediction is performed in the following order (for example):

a) f(0, 5, 5), f(0, 5, 4), f(0, 5, 3), f(0, 5, 2), f(0, 5, 1)

b) f(0, 4, 4), f(0, 4, 3), f(0, 4, 2), f(0, 4, 1)

c) f(0, 3, 3), f(0, 3, 2), f(0, 3, 1)

d) f(0, 2, 2), f(0, 2, 1)

e) f(0, 1, 1)

In other words, motion estimation/compensation can be performed in units of macroblocks on the above 15 temporal-spatial reference pictures, with the reference pictures being determined using the previously defined angle θ.

(3) During temporal-spatial estimation encoding of (1) and (2), a macroblock that is most similar to a currently encoded macroblock can be searched for from the reference pictures and motion estimation/compensation and residual transform coding can be performed on the found macroblock.

According to further embodiments of the present invention, decoding methods can be similarly performed inversely with respect to the aforementioned encoding methods, for example. As described with reference to FIGS. 6A and 6B, once the multiplexed base layer videos and enhancement layer videos are received, the multiplexed videos can be decomposed into individual layer videos and decoded.

As described above, according to embodiments of the present invention, 3-dimensional videos acquired using a number of cameras can be efficiently encoded, resulting in superior video display quality.

Methods for 3-dimensional encoding of videos can be implemented through computer readable code, e.g., as computer programs. Codes and code segments making up the computer readable code can be easily construed by skilled computer programmers. Also, the computer readable code can be stored/transferred on computer readable media, with and methods for 3-dimensional encoding/decoding of videos being implemented by reading and executing the computer readable codes. The computer readable media include non-transitory magnetic recording media, and optical recording media, for example.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for 3-dimensional encoding of videos, the method comprising:

performing temporal estimation on video taken by a centerly located camera with reference to video taken by the centerly located camera at at least an immediately previous time, when a plurality of other cameras are arranged in a row, with the centerly located camera being at a central position of the row; and performing temporal-spatial estimation on videos taken by the other cameras with reference to previous-in-time videos taken by cameras adjacent to the centerly located camera and the video taken by the centerly located camera at the at least the immediately previous time.

2. The method of claim 1, wherein a result of the performed temporal estimation on video taken by the centerly located camera is a base layer video and a result of the performed temporal-spatial estimation on videos taken by the other cameras is at least one enhancement layer video for the base layer video.

3. The method of claim 1, wherein in the performing of the temporal-spatial estimation on videos taken by the other cameras the temporal-spatial estimation is performed at least on previous-in-time videos referred to by the videos taken by the other cameras with reference at least to a number of previous-in-time videos which is equal to a predetermined number of reference pictures.

4. The method of claim 3, wherein the predetermined number of reference pictures is 5.

5. The method of claim 3, wherein in the temporal-spatial estimation on videos taken by the other cameras temporal-spatial estimation is also performed with reference further to current videos taken by camera adjacent to the centerly located camera.

6. The method of claim 3, wherein in the temporal-spatial estimation on videos taken by the other cameras temporal-spatial estimation is performed with reference to videos taken by all of a plurality of cameras that fall within a range of an angle between previous-in-time videos taken by cameras adjacent to the centerly located camera and videos to be presently estimated.

7. A method for 3-dimensional encoding of videos, the method comprising:

referring to a previous-in-time video taken by a camera adjacent to a center of a video to be presently encoded; and performing temporal-spatial estimation with further reference to as many previous-in-time videos adjacent to the camera adjacent to the center of the video according to a predetermined number of reference pictures.

8. The method of claim 7, wherein a result of the referring is a base layer video and a result of the performed temporal-spatial estimation is at least one enhancement layer video for the base layer video.

9. The method of claim 7, wherein an angle between the camera adjacent to the center of the video and the video to be presently encoded varies according to an interval between adjacent cameras.

10. A method for 3-dimensional encoding of videos, by which a plurality of videos taken by cameras arranged 2-dimensionally are encoded, the method comprising:

encoding videos taken by a camera centerly located among other cameras arranged 2-dimensionally; and sequentially encoding videos taken by the other cameras in an order based on shortest distances from the centerly located camera.

11. The method of claim 10, wherein a result of the encoding of videos taken by the camera centerly located is a base layer video and a result of the sequential encoding is at least one enhancement layer video for the base layer video.

12. The method of claim 10, wherein in the sequentially encoding, if there are a plurality of cameras having a same distance from the centerly located camera, encoding of the plurality of cameras having the same distance is sequentially performed in a spiral manner.

13. A non-transitory computer readable medium comprising computer readable code to implement a method for 3-dimensional encoding of videos, the method comprising:

performing temporal estimation on video taken by a centerly located camera with reference to videos taken by the centerly located camera at least an immediately previous time, when a plurality of other cameras are arranged in a row, with the centerly located camera being at a central position of the row; and performing temporal-spatial estimation on videos taken by the other cameras with reference to previous-in-time videos taken by cameras adjacent to the centerly located camera and the video taken by the centerly located camera at the at least the immediately previous time.

14. The medium of claim 13, wherein a result of the performed temporal estimation on video taken by the centerly located camera is a base layer video and a result of the performed temporal-spatial estimation on videos taken by the other cameras is at least one enhancement layer video for the base layer video.

15. An encoder for 3-dimensional encoding, comprising:

a first encoder to perform temporal estimation on video taken by a centerly located camera with reference to video taken by the centerly located camera at least an immediately previous time, when a plurality of other cameras are arranged in a row, with the centerly located camera being at a central position of the row;

a second encoder to perform temporal-spatial estimation on videos taken by the other cameras with reference to previous-in-time videos taken by cameras adjacent to the centerly located camera and the video taken by the centerly located camera at the at least the immediately previous time; and a multiplexer to multiplex an output of the first encoder and an output of the second encoder.

16. The encoder of claim 15, wherein in the second encoder the temporal-spatial estimation is performed at least on previous-in-time videos referred to by the videos taken by the other cameras with reference at least to a number of previous-in-time videos which is equal to a predetermined number of reference pictures.

17. The encoder of claim 16, wherein the predetermined number of reference pictures is 5.

18. The encoder of claim 16, wherein in the second encoder temporal-spatial estimation is also performed with reference to further current videos taken by cameras adjacent to the centerly located camera.

19. The encoder of claim 16, wherein in the second encoder temporal-spatial estimation is performed with reference to videos taken by all of a plurality of cameras that fall within a range of an angle between previous-in-time videos taken by cameras adjacent to the centerly located camera and videos to be presently estimated.

20. The encoder of claim 16, wherein an output of the first encoder is a base layer video and an output of the second encoded is at least one enhancement layer video for the base layer video.

21. An encoder for 3-dimensional encoding of videos, comprising:

a first encoder encoding present time video taken by a camera adjacent to a center of a video by referring to a previous-in-time video of the camera adjacent to the center of the video;

a second encoder to perform temporal-spatial estimation with further reference to as many previous-in-time videos adjacent to the camera adjacent to the center of the video according to a predetermined number of reference pictures; and a multiplexer to multiplex an output of the first encoder and an output of the second encoder.

22. The encoder of claim 21, wherein an angle between the camera adjacent to the center of the video and the video to be presently encoded varies according to an interval between adjacent cameras.

23. The encoder of claim 21, wherein an output of the first encoder is a base layer video and an output of the second encoded is at least one enhancement layer video.

24. An encoder for 3-dimensional encoding of videos, by which a plurality of videos taken by cameras arranged 2-dimensionally are encoded, comprising:

a first encoder to encode videos taken by a camera centerly located among other cameras arranged 2-dimensionally;

a second encoder to sequentially encode videos taken by the other cameras in an order based on shortest distances from the centerly located camera; and a multiplexer to multiplex an output of the first encoder and an output of the second encoder.

25. The encoder of claim 24, wherein in the second encoder, if there are a plurality of cameras having a same distance from the centerly located camera, encoding of the plurality of cameras having the same distance is sequentially performed in a spiral manner.

26. The encoder of claim 24, wherein an output of the first encoder is a base layer video and an output of the second encoded is at least one enhancement layer video for the base layer video.

27. An encoding system for 3-dimensional encoding, comprising:

a plurality of cameras, with at least one camera of the plurality of cameras being centerly located among the plurality of cameras;

a first encoder to perform temporal estimation on video taken by the centerly located camera with reference to video taken by the centerly located camera at least an immediately previous time, when a plurality of other cameras, of the plurality of cameras, are arranged in a row, with the centerly located camera being at a central position of the row;

a second encoder to perform temporal-spatial estimation on videos taken by the other cameras with reference to previous-in-time videos taken by cameras adjacent to the centerly located camera and the video taken by the centerly located camera at the at least the immediately previous time; and a multiplexer to multiplex an output of the first encoder and an output of the second encoder.

28. The encoding system of claim 27, wherein in the second encoder the temporal-spatial estimation is performed at least on previous-in-time videos referred to by the videos taken by the other cameras with reference at least to a number of previous-in-time videos which is equal to a predetermined number of reference pictures.

29. The encoding system of claim 28, wherein in the second encoder temporal-spatial estimation is performed with reference to videos taken by all of a plurality of cameras that fall within a range of an angle between previous-in-time videos taken by cameras adjacent to the centerly located camera and videos to be presently estimated.

30. The encoding system of claim 27, wherein an output of the first encoder is a base layer video and an output of the second encoded is at least one enhancement layer video for the base layer video.

31. A method for 3-dimensional decoding of videos, the method comprising:

demultiplexing a video bitstream into a base layer video and at least one enhancement layer video;

decoding the base layer video, to decode video encoded by performed temporal estimation for video taken by a centerly located camera with reference to video taken by the centerly located camera at least an immediately previous time, when a plurality of other cameras were arranged in a row, with the centerly located camera being at a central position of the row; and decoding the at least one enhancement layer video, based on network resources, to decode video encoded by performed temporal-spatial encoding on videos taken by the other cameras with reference to previous-in-time videos taken by cameras adjacent to the centerly located camera and the video taken by the centerly located camera at the at least the immediately previous time.

32. The method of claim 31, wherein in the encoding of the at least one enhancement layer video, in the performed temporal-spatial estimation on videos taken by the other cameras, the temporal-spatial estimation was performed at least on previous-in-time videos referred to by the videos taken by the other cameras with reference at least to a number of previous-in-time videos which is equal to a predetermined number of reference pictures.

33. The method of claim 32, wherein the predetermined number of reference pictures was 5.

34. The method of claim 32, wherein in the encoding of the at least one enhancement layer video, in the performed temporal-spatial estimation on videos taken by the other cameras, the temporal-spatial estimation was also performed with reference to then further current videos taken by cameras adjacent to the centerly located camera.

35. The method of claim 32, wherein in the encoding of the at least one enhancement layer video, in the performed temporal-spatial estimation on videos taken by the other cameras, the temporal-spatial estimation was performed with reference to videos taken by all of a plurality of cameras that fell within a range of an angle between previous-in-time videos taken by cameras adjacent to the centerly located camera and videos to then currently be estimated.

36. A method for 3-dimensional decoding of videos, the method comprising:

demultiplexing a video bitstream into a base layer video and at least one enhancement layer video;

decoding the base layer video, to decode video encoded by referring to a previous-in-time video taken by a camera adjacent to a center of a video to be then presently encoded; and decoding the at least one enhancement layer video, based on network resources, to decode video encoded by performed temporal-spatial estimation with further reference to as many previous-in-time videos adjacent to the camera adjacent to the center of the video according to a predetermined number of reference pictures.

37. The method of claim 36, wherein an angle between the camera adjacent to the center of the video and the video to be then presently encoded varied according to an interval between adjacent cameras.

38. A method for 3-dimensional decoding of videos, by which a plurality of videos taken by cameras arranged 2-dimensionally were encoded, the method comprising:

demultiplexing a video bitstream into a base layer video and at least one enhancement layer video;

decoding the base layer video, to decode video encoded by encoding videos taken by a camera centerly located among other cameras arranged 2-dimensionally; and decoding the at least one enhancement layer video, based on network resources, to decode video encoded by sequentially encoding videos taken by the other cameras in an order based on shortest distances from the centerly located camera.

39. The method of claim 38, wherein in the decoding of the sequentially encoded at least one enhancement layer video, if there were a plurality of cameras having a same distance from the centerly located camera, the encoding of the plurality of cameras having the same distance was sequentially performed in a spiral manner.

40. A non-transitory computer readable medium comprising computer readable code to implement a method for 3-dimensional decoding of videos, the method comprising:

demultiplexing a video bitstream into a base layer video and at least one enhancement layer video;

decoding the base layer video, to decode video encoded by performed temporal estimation on videos taken by a centerly located camera with reference to videos taken by the centerly located camera at least an immediately previous time, when a plurality of other cameras were arranged in a row, with the centerly located camera being at a central position of the row; and decoding the at least one enhancement layer video, based on network resources, to decode video encoded by performed temporal-spatial estimation on videos taken by the other cameras with reference to previous-in-time videos taken by cameras adjacent to the centerly located camera and the video taken by the centerly located camera at the at least the immediately previous time.

41. A decoder for 3-dimensional decoding of videos, comprising:

a demultiplexer to demultiplex a video bitstream into a base layer video and at least one enhancement layer video;

a first decoder to decode the base layer video, by decoding video encoded by performed temporal estimation for video taken by a centerly located camera with reference to video taken by the centerly located camera at least an immediately previous time, when a plurality of other cameras were arranged in a row, with the centerly located camera being at a central position of the row; and a second decoder to decode the at least one enhancement layer video, based on network resources, by decoding video encoded by performed temporal-spatial encoding on videos taken by the other cameras with reference to previous-in-time videos taken by cameras adjacent to the centerly located camera and the video taken by the centerly located camera at the at least the immediately previous time.

42. The decoder of claim 41, wherein in the encoding of the at least one enhancement layer video, in the performed temporal-spatial estimation on videos taken by the other cameras, the temporal-spatial estimation was performed at least on previous-in-time videos referred to by the videos taken by the other cameras with reference at least to a number of previous-in-time videos which is equal to a predetermined number of reference pictures.

43. The decoder of claim 42, wherein the predetermined number of reference pictures was 5.

44. The decoder of claim 42, wherein in the encoding of the at least one enhancement layer video, in the performed temporal-spatial estimation on videos taken by the other cameras, the temporal-spatial estimation was also performed with further reference to then current videos taken by cameras adjacent to the centerly located camera.

45. The decoder of claim 42, wherein in the encoding of the at least one enhancement layer video, in the performed temporal-spatial estimation on videos taken by the other cameras, the temporal-spatial estimation was performed with reference to videos taken by all of a plurality of cameras that fell within a range of an angle between previous-in-time videos taken by cameras adjacent to the centerly located camera and videos to then currently be estimated.

46. A decoder for 3-dimensional decoding of videos, comprising:
a demultiplexer to demultiplex a video bitstream into a base layer video and at least one enhancement layer video;
a first decoder to decode the base layer video, by decoding video encoded by referring to a previous-in-time video taken by a camera adjacent to a center of a video to be then presently encoded; and
a second decoder to decode the at least one enhancement layer video, based on network resources, by decoding video encoded by performed temporal-spatial estimation with further reference to as many previous-in-time videos adjacent to the camera adjacent to the center of the video according to a predetermined number of reference pictures.

47. The decoder of claim 46, wherein an angle between the camera adjacent to the center of the video and the video to be then presently encoded varied according to an interval between adjacent cameras.

48. A decoder for 3-dimensional decoding of videos, by which a plurality of videos taken by cameras arranged 2-dimensionally were encoded, comprising:
a demultiplexer to demultiplex a video bitstream into a base layer video and at least one enhancement layer video;
a first decoder to decode the base layer video, by decoding video encoded by encoding videos taken by a camera centerly located among other cameras arranged 2-dimensionally; and
a second decoder to decode the at least one enhancement layer video, based on network resources, by decoding video encoded by sequentially encoding videos taken by the other cameras in an order based on shortest distances from the centerly located camera.

49. The decoder of claim 48, wherein in the decoding of the sequentially encoded at least one enhancement layer video, if there were a plurality of cameras.

* * * * *

UNITED STATES PATENT AND TRADEMARK OFFICE
CERTIFICATE OF CORRECTION

| | | |
|---|---|---|
| PATENT NO. | : 7,817,181 B2 | Page 1 of 1 |
| APPLICATION NO. | : 11/038477 | |
| DATED | : October 19, 2010 | |
| INVENTOR(S) | : Yung-Iyul Lee | |

It is certified that error appears in the above-identified patent and that said Letters Patent is hereby corrected as shown below:

Column 10, Line 57, change "by camera" to --by cameras--.

Column 11, Line 38, change "at least" to --at at least--.

Column 11, Line 56, change "at least" to --at at least--.

Column 12, Line 42, change "enhancement layer video." to --enhancement layer video for the base layer video.--.

Column 13, Line 3, change "at least" to --at at least--.

Column 13, Line 39, change "at least" to --at at least--.

Column 14, Line 52, change "at least" to --at at least--.

Column 15, Line 4, change "at least" to --at at least--.

Signed and Sealed this
Fifth Day of April, 2011

David J. Kappos
*Director of the United States Patent and Trademark Office*